United States Patent
Li et al.

(10) Patent No.: US 12,254,380 B2
(45) Date of Patent: Mar. 18, 2025

(54) METHOD OF STIMULATING A CONDITIONAL QUANTUM MASTER EQUATION IN A QUANTUM TRANSPORT PROCESS BY A RECURRENT NEURAL NETWORK

(71) Applicant: University of Electronic Science and Technology of China, Chengdu (CN)

(72) Inventors: Xiaoyu Li, Chengdu (CN); Qinsheng Zhu, Chengdu (CN); Yong Hu, Chengdu (CN); Qing Yang, Chengdu (CN); Junyi Lu, Chengdu (CN)

(73) Assignee: University of Electronic Science and Technology of China, Chengdu (CN)

(*) Notice: Subject to any disclaimer, the term of this patent is extended or adjusted under 35 U.S.C. 154(b) by 27 days.

(21) Appl. No.: 17/432,198

(22) PCT Filed: May 26, 2021

(86) PCT No.: PCT/CN2021/095988
§ 371 (c)(1),
(2) Date: Aug. 19, 2021

(87) PCT Pub. No.: WO2022/160528
PCT Pub. Date: Aug. 4, 2022

(65) Prior Publication Data
US 2024/0046129 A1    Feb. 8, 2024

(30) Foreign Application Priority Data

Jan. 27, 2021   (CN) .......................... 202110111596.2

(51) Int. Cl.
*G06N 3/04*       (2023.01)
*G06N 3/0442*     (2023.01)
*G06N 10/20*      (2022.01)

(52) U.S. Cl.
CPC ........... *G06N 10/20* (2022.01); *G06N 3/0442* (2023.01)

(58) Field of Classification Search
CPC ........ G06N 10/00; G06N 10/20; G06N 3/044; G06N 3/0442
See application file for complete search history.

(56) References Cited

U.S. PATENT DOCUMENTS

2022/0199888 A1*  6/2022  Daraeizadeh .......... G06N 10/00
2023/0274136 A1*  8/2023  Zwolak ................... G06N 3/08
                                                    706/25

OTHER PUBLICATIONS

Leonardo Banchi, Edward Grant, Andrea Rocchetto, and Simone Severini, "Modelling non-markovian quantum processes with recurrent neural networks," New Journal of Physics, vol. 20, Dec. 2018, DOI 10.1088/1367-2630/aaf749 (Year: 2018).*

* cited by examiner

*Primary Examiner* — Hal Schnee
(74) *Attorney, Agent, or Firm* — Getech Law LLC; Jun Ye

(57) ABSTRACT

The disclosure claims a method of stimulating a conditional quantum master equation in a quantum transport process by a recurrent neural network, comprising the following steps of: establishing a recurrent neural network which is a long short term memory network (LSTM), wherein the LSTM comprises TLSTM cells arranged in chronological order, and each LSTM cell has an input value $x_t$ and an output value $h_t$, and there is a parameter (W, b) in the LSTM cell; replacing the input value $x_t$ with a shot noise spectrum $S(\omega)$ of the current obtained according to the conditional quantum master equation; replacing the output value $h_t$ with a trace of density matrices in the conditional quantum master equation; and replacing the parameter (W, b) with a connection (Continued)

---

Establish a recurrent neural network which is a long short term memory network (LSTM)

↓

Replace an input value with a shot noise spectrum of the current obtained according to the conditional quantum master equation; replace an output value with a trace of density matrices in the conditional quantum master equation; replace a parameter (W, b) with a connection between traces of density matrices in the conditional quantum master equation at imminent moments

↓

Train the recurrent neural network by using the data of the shot noise spectrum generated in the quantum transport process to achieve the purpose of simulating the conditional quantum master equation between density matrices in the conditional quantum master equation at imminent moments.

10 Claims, 4 Drawing Sheets

METHOD OF STIMULATING A CONDITIONAL QUANTUM MASTER EQUATION IN A QUANTUM TRANSPORT PROCESS BY A RECURRENT NEURAL NETWORK

TECHNICAL FIELD

The disclosure relates to a method of stimulating a conditional quantum master equation in a quantum transport process by a recurrent neural network

BACKGROUND

Quantum transport, as an important physical phenomenon in the mesoscopic system, has been widely studied in recent years. For traditional devices, the signal-noise ratio can be improved by suppressing shot noise, but in a system composed of quantum dots, shot noise will not be infinitely reduced. In fact, the quantum transport noise from quantum devices is not necessarily harmful. These shot noises related to precise time can sensitively reflect the precise dynamics, rich quantum transport properties, and precise energy scale in the transport process. Therefore, testing and analysis of quantum shot noise systems will become important theoretical tools and methods in the study of transport characteristics of low-dimensional mesoscopic nano-devices.

We need an open system with noise and quantum dots and study its properties for theoretical calculation. Many methods have been proposed for the research, including the scattering matrix method proposed by Buttiker and Beenaker et al, non-equilibrium Green function method and quantum master equation method. Unlike previous studies, Li Xingqi et al. proposed a conditional master equation to study the detailed transport process of charge bits, based on Gurvitz's method.

Although the conditional quantum master equation can describe the charge transport process in detail, it is very difficult to further study the physical quantities related to this process, as the equation is an infinite recursive differential equation system. It is extremely important to solve the conditional quantum master equation in the transport process.

Therefore, it is an urgent problem to be solved in the field to provide a method of stimulating a conditional quantum master equation in a quantum transport process by a recurrent neural network. The recurrent neural network simulating the conditional quantum master equation can be used to guide the design of micro-nano quantum devices.

SUMMARY

The objective of the disclosure is to overcome the shortcomings of the prior art and provide a method of stimulating a conditional quantum master equation in a quantum transport process by a recurrent neural network.

The objective of the disclosure is realized by means of the following technical solution:

The disclosure first provides a method of stimulating a conditional quantum master equation in a quantum transport process by a recurrent neural network, comprising the following steps of:

establishing a recurrent neural network which is a long short term memory network (LSTM), wherein the LSTM comprises T LSTM cells arranged in chronological order, and each LSTM cell has an input value $x_t$ and an output value $h_t$, and the output value $h_t$ will be transferred into the LSTM cell at the next moment, in which there is a parameter (W, b);

replacing the input value $x_t$ with a shot noise spectrum of the current obtained according to the conditional quantum master equation; replacing the output value $h_t$ with a trace of density matrices in the conditional quantum master equation; replacing the parameter (W, b) with a connection between traces of density matrices in the conditional quantum master equation at t−1 and t; and training the recurrent neural network by using the data of shot noise spectrum generated in the quantum transport process to achieve the purpose of simulating the conditional quantum master equation, wherein the quantum transport process corresponds to a physically realizable system.

Further, the conditional quantum master equation is derived from a two-level charge qubit transport system comprising a quantum dot system S and a power supply V, and a left electrode L of the quantum dot system S is connected to a positive electrode of the power supply V, while a right electrode R of the quantum dot system S is connected to a negative electrode of the power supply V; and the total Hamiltonian of the two-level charge qubit transport system is as follows:

$$H = H_S(a_\mu^\dagger, a_\mu) + H_E + H'$$

where: $H_S$ represents the Hamiltonian of the quantum dot system S; $H_E$ represents the Hamiltonian of the left electrode L and the right electrode R; and H' represents the Hamiltonian arising from the interaction between the quantum dot system S and the electrodes.

Further, it is assumed that the quantum dot system S does not strongly interact with the environment and H' is treated as a perturbation, the quantum master equation describing the quantum transport process is obtained according to the second-moment cumulant expansion and the Lindblad equation:

$$\dot{\rho}(t) = -iL\rho(t) - \int_0^t d\tau \langle L'(t)G(t,\tau)L'(\tau)G^\dagger(t,\tau)\rangle \rho(t) \text{ where:}$$

Liouville superoperator is defined as $L(\cdots) \triangleq [H_s, (\cdots)]$, $$L'(\cdots) \triangleq [H', (\cdots)].$$

$$G(t,\tau) \triangleq G(t,\tau) \times (\cdots) \times G^\dagger(t,\tau), G(t,\tau)$$

is a propagator related to the Hamiltonian $H_S$ of the quantum dot system S; a reduced density matrix of the quantum dot system S is $\rho(t)=Tr_E[\rho_T(t)]$, $\langle (\ldots) \rangle = Tr_E[(\ldots)\rho_E]$, and $\rho_E$ represents a density matrix of electrodes; i represents an imaginary unit, and $\rho(t)$ represents a density matrix at t, and $\tau$ represents any moment less than t, and $\dot{\rho}(t)$ represents a derivative of $\rho(t)$ with respect to time;

The Hilbert space where the electrodes are located is divided, using $E^{(n)}$ to represent the space where the electrodes are located under the conditions that n electrons pass through the quantum dot system S within Dt, and such space can be represented as $E = \oplus_n E^{(n)}$; the conditional quantum master equation can be obtained by substituting the assumption above into the quantum master equation:

$$\dot{\rho}^{(n)}(t) = -iL\rho^{(n)}(t) - \int_0^t d\tau Tr_{E^{(n)}}[L'(t)G(t,\tau)L'(\tau)G^\dagger(t,\tau)\rho_T(t)]$$

where: $\rho^{(n)}(t) = Tr_{E^{(n)}}[\rho_T(t)]$ represents the reduced density matrix of the quantum dot system S under the conditions that n electrons pass through the system within Dt; $\rho^{(n)}(t)$ represents the reduced density matrix of the quantum dot system S under the conditions that n electrons pass through the system within Dt; $\dot{\rho}^{(n)}(t)$ represents a derivative of $\rho^{(n)}(t)$ respect to time.

Further, the concrete forms of $H_S$, $H_E$ and $H'$ are as follows:

$$H_s = \sum_{s=\uparrow,\downarrow} \sum_{j=1,2}' \acute{U}_j a_{js}^\dagger a_{js} + \sum_{j=1,2} \omega \cdot n_{j\uparrow} n_{j\downarrow} + C_E \left( \sum_{s=\uparrow,\downarrow} \sum_{j=1,2} n_{js} \right)^2$$

$$H_E = \sum_{\alpha=L,R} \sum_{s=\uparrow,\downarrow} \sum_k \acute{U}_{\alpha ks} c_{\alpha ks}^\dagger c_{\alpha ks}$$

$$H' = \sum_{\alpha=L,R} \sum_{s=\uparrow,\downarrow} \sum_{j=1,2} \sum_k \tau_{\alpha kj} c_{\alpha ks}^\dagger a_{js} + h.c.$$

where: s represents the spin of the electrons, and ↑,↓ represents spinning up and spinning down respectively; j represents the energy level, and $\acute{U}_j$ represents the energy at the level j; $a_{js}^\dagger/a_{js}$ is represents creation/annihilation operators of electrons at the level j and with the spin s; ω represents Coulomb energy of two electrons at the same level but with different spins, and $n_{j\uparrow}$, $n_{j\downarrow}$ and $n_{js}$ represents number operators of electrons at the level j and with the spins ↑,↓, s; $C_E$ represents charge energy related to electrons at all levels; α represents electrodes; k represents momentum of electrons; $\acute{U}_{\alpha ks}$ represents energy of electrons with the momentum k at the electrodes; and considering that the electrons on the electrodes are in thermal statistical equilibrium, the distribution function is as follows:

$$f(\acute{U}) = \frac{1}{\exp\left[(\acute{U}-\mu)/k_B T\right]+1}$$

μ represents Fermi energy which is equal to $\mu_L$=eV/2, $\mu_R$=−eV/2, considering that external voltages are applied to the system in pairs; T represents temperature, i.e. the temperature of quantum transport system, and $k_B$ represents Boltzmann constant;

$c_{\alpha ks}^\dagger$ represents the creation operator of electrons with the spin s and the momentum k at the electrode α; $c_{\alpha ks}$ represents annihilation operator of electrons with the spin s and momentum k at the electrode α; $\tau_{\alpha kj}$ represents the strength of the interaction between the system and the environment, and h.c. represents Hermitian conjugate.

Further, it is assumed that $\rho_E^{(n)}=\rho_E^{(n\pm1)}=\rho_E^{(0)}$, the conditional quantum master equation can be rewritten under the Markov approximation:

$$\dot{\rho}^{(n)}(t) = -iL\rho^{(n)}(t) - \frac{1}{2}\sum_{js}\{[a_{js}^\dagger A_{js}^{(-)}\rho^{(n)} + \rho^{(n)}A_{js}^{(+)}a_{js}^\dagger - A_{Ljs}^{(-)}\rho^{(n)}a_{js}^\dagger - a_{js}^\dagger\rho^{(n)}A_{Ljs}^{(+)} - A_{Ljs}^{(-)}\rho^{(n-1)}a_{js}^\dagger - a_{js}^\dagger\rho^{(n+1)}A_{Rjs}^{(+)}] + h.c.\};$$

where:

$$A_{js}^{(\pm)} = \sum_{\alpha=L,R} A_{\alpha js}^{(\pm)}, \ A_{\alpha js}^{(\pm)} = C_{\alpha js}^{(\pm)}(\gamma)\alpha_{js}, \ C_{\alpha js}^{(\pm)}$$

is the spectral function of electrons in the electrode; $\rho^{(n)}$ is $\rho^{(n)}(t)$, and $a_{jz}^+$ represents the creation operator of electrons at the level of j and with the spin s; $a_{js}^+$ represents the annihilation operator of electrons at the level j and with the spin s; and γ represents an independent variable in the spectral function $C_{\alpha js}^{(\pm)}$;

The current flowing through the quantum dot system S is expressed as:

$$I(t) = e\frac{d\left[\sum_n nP(n,t)\right]}{dt} = e\sum_n nTr[\rho^{(n)}(t)];$$

where: P(n,t) represents a probability of passing through the quantum dot system S by n electrons within Dt, and e represents the unit charge, and n represents the number of electrons passing through the quantum dot system S per unit time;

According to the MacDonald formula, the shot noise spectrum of current is expressed as:

$$S(\omega) = 2\omega \int_0^\omega dt\sin(\omega t)\frac{d}{dt}[\langle n^2(t)\rangle - \langle \overline{It}\rangle^2]$$

where: ω represents an independent variable in the function of the shot noise S(ω).

Further, the connection between the density matrices of the two-level charge qubit transport system at different moments is expressed by the Kraus operator, i.e. the quantum hidden Markov: i.e. $\rho(t+Dt)=\Sigma_n\rho^{(n)}(t)K_m^\dagger$, where, m denotes different K values, and Km is the $m^{th}$ Kraus operator; the formula is equivalent to the quantum master equation;

Based on the conditional quantum master equation, $\Sigma_n\rho^{(n)}(t+\Delta t)=\Sigma_m K_m\Sigma_n\rho^{(n)}(t)K_m^\dagger$ can be obtained by substituting $\rho(t)=\Sigma_n\rho^{(n)}(t)$ into the formula above;

According to the rewritten equation of the conditional quantum master equation, $\rho^{(n)}(t+Dt)$ is related to $\rho^{(n)}(t)$, $\rho^{(n-1)}(t),\rho^{(n+1)}(t)$, so it can be derived from the above formula: $\rho^{(n)}(t+Dt)=\phi(\Sigma_m K_m(\rho^{(n)}(t)+\rho^{(n-1)}(t)+\rho^{(n+1)}(t))K_m^\dagger)$; that is, the formula is related to the rewritten equation of the conditional quantum master equation, with an aim at constructing the time-free mapping $\phi(\Sigma_m K_m(\ldots)K_m^\dagger)$.

Further, the connection between the input value $x_t$ and the output value $h_t$ of the LSTM cell is expressed through the following equation:

$$f_t = \sigma(W_f \cdot [h_{t-1}, x_t] + b_f)$$

$$i_t = \sigma(W_i \cdot [h_{t-1}, x_t] + b_i)$$

$$\tilde{C}_t = \tanh(W_c \cdot [h_{t-1}, x_t] + b_c)$$

$$O_t = \sigma(W_O \cdot [h_{t-1}, x_t] + b_O)$$

$$h_t = O_t \times \tanh(C_t)$$

where: ($W_f$, $W_i$, $W_c$, $W_o$, $b_f$, $b_i$, $b_c$, $b_o$) is the parameter (W, b); $f_t$ is an output of a forget gate layer, and $i_t$ and $\tilde{C}_t$ are outputs of an input gate layer, and $O_t$ and $h_t$ are outputs of an output gate layer.

Further, the connection between the traces of density matrices at t−1 and t is constructed by using the data of the shot noise spectrum, namely $Tr[\phi(\Sigma_m K_m(\ldots)K_m^\dagger)]$;

$Tr[\rho^{(n)}(t)]$ corresponds to the parameter $h_t$ in the LSTM;

The parameter (W,b) in the LSTM can be used as Tr[σ ($\Sigma_m K_m$( ... )$K_m^\dagger$)].

Further, said method comprises the following steps:

The effective range of n is determined through the contribution of Tr[$\rho^{(n)}$(t)] to the total current, and n represents the number of particles in the rewritten equation of the conditional quantum master equation; the evaluation function is defined:

$$E(M) = \frac{MP_M}{\sum_{n=0}^{M-1} nPn}$$

where: M is the maximum value of particle quantity that can be taken in numerical experiments, and $P_M$ is the probability value of M electrons flowing through the quantum dot system;

The image that E(M) changes with M is drawn by continuously adjusting the values of M, and the change image can be used to determine the value of M.

Further, the data of shot noise spectrum generated in the quantum transport process comprises training data and test data;

The recurrent neural network is trained by the training data to obtain a first connection between the error of the training data and the number of iterations and tested by the test data to obtain a second connection between the error of the test data and the number of iterations;

The first connection and the second connection are used to determine the effect of simulating the conditional quantum master equation by the LSTM.

The disclosure has the following beneficial effects:

(1) In an exemplary embodiment of the disclosure, a connection between the LSTM and the conditional quantum master equation in the recurrent neural network is established to obtain an equivalence connection between the two. Meanwhile, the problem of infinite loop closure of the equation when solving the conditional quantum master equation is solved by utilizing the data of the shot noise spectrum generated by the quantum system, and the simulation of the conditional quantum master equation by the recurrent neural network is realized.

(2) In another exemplary embodiment of the disclosure, a derivation premise of the conditional quantum master equation, that is, the specific implementation of the two-level charge qubit transport system, is disclosed; meanwhile, in another exemplary embodiment of the disclosure, a specific structure of the LSTM is disclosed.

(3) In another exemplary embodiment of the disclosure, the effective range of n is determined through the contribution of Tr[$\rho^{(n)}$(t)] to the total current, so as further to solve the problem of infinite loop closure of the equation when solving the conditional quantum master equation, and realize the simulation of the conditional quantum master equation by the recurrent neural network.

DETAILED DESCRIPTION OF THE PREFERRED EMBODIMENTS

The following is a clear and complete description of the technical schemes in the disclosure along with the drawings. Obviously, the embodiments are only some of rather than all of the embodiments of the disclosure. All other embodiments obtained by persons of ordinary skill in the art based on the embodiments of the disclosure without creative efforts shall fall within the protection scope of the disclosure.

The terms used in this application are for the sole purpose of describing particular embodiments and not intended to limit this application. The singular forms "one," "said" and "that" used in this application and the appended claims are also intended to include the plural forms, unless otherwise indicated in the context. It should also be understood that the term "and/or" as used herein refers to and includes any or all possible combinations of one or more relevant listed items.

It should be understood that the information should not be limited by "first", "second", "third" and other terms which are used in this application to describe such information. These terms are only used to distinguish the same type of information from each other. For example, in this application, first information may also be referred to as second information, and vice versa. Besides, the word "if" as used herein may, depending on the context, be interpreted as "while" or "when" or "responding to a determination".

Moreover, the technical characteristics involved in different embodiments of the disclosure as described below can be combined together provided there is no discrepancy among them.

Specifically, in the following exemplary embodiments, the conditional quantum master equation describing the quantum transport process is derived, and the quantum hidden Markov process is found to have a certain connection with the quantum main equation. The connection between the quantum hidden Markov process and the recurrent neural network is found by unfolding the calculation view of the quantum hidden Markov process. The recurrent neural network is then trained by using the data of the noise spectrum generated in the quantum transport process (a physically realizable system) to achieve the purpose of simulating the conditional quantum master equation. It can be used in the design of micro-nano quantum devices.

Figure 1:
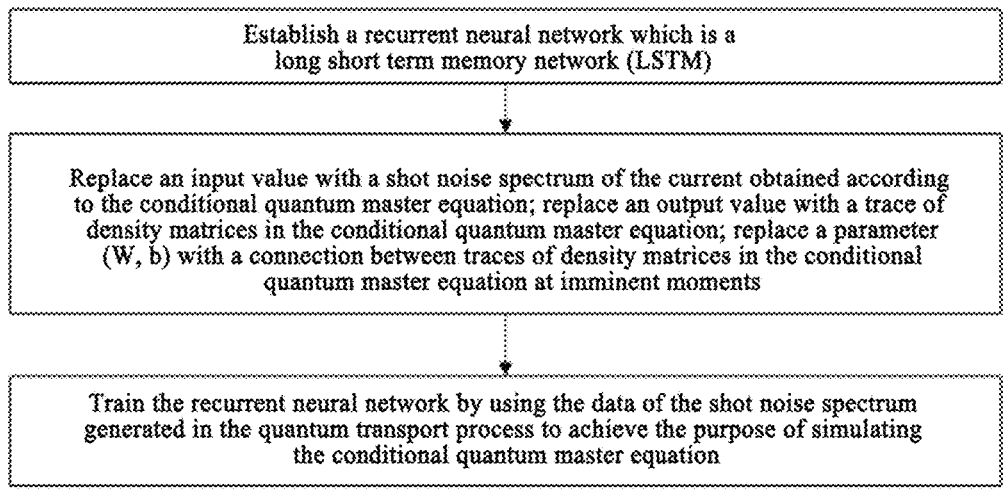
FIG. 1 is a flow chart of a method according to an exemplary embodiment of the disclosure.

With reference to FIG. 1, FIG. 1 illustrates a method of stimulating a conditional quantum master equation in a quantum transport process by a recurrent neural network according to an exemplary embodiment of the disclosure, comprising the following steps:

A recurrent neural network which is a long short term memory network (LSTM) is established, wherein the LSTM comprises T LSTM cells arranged in chronological order, and each LSTM cell has an input value $x_t$ and an output value $h_t$, and the output value $h_t$ will be transferred into the LSTM cell at the next moment, in which there is a parameter (W, b);

The input value $x_t$ is replaced with a shot noise spectrum $S(\omega)$ (representing the actual calculated value, which can be collected from the quantum transport system under experimental conditions) of the current obtained according to the conditional quantum master equation; the output value $h_t$ is replaced with a trace of density matrices $\text{Tr}[\rho^{(n)}(t)]$ in the conditional quantum master equation; and the parameter (W, b) is replaced with a connection $\text{Tr}[\sigma\Sigma_m K_m( \ldots )K_m^\dagger]$ between the traces of density matrices in the conditional quantum master equation at t−1 and t.

The recurrent neural network is trained by using the data of shot noise spectrum generated in the quantum transport process to achieve the purpose of simulating the conditional quantum master equation, wherein the quantum transport process corresponds to a physically realizable system.

Specifically, in the exemplary embodiment, the connection between the LSTM and the conditional quantum master equation in the recurrent neural network is established to obtain an equivalence connection between the two. Meanwhile, the problem of infinite loop closure of the equation when solving the conditional quantum master equation is solved by utilizing the data of the shot noise spectrum generated by the quantum system, and the simulation of the conditional quantum master equation by the recurrent neural network is realized.

It is to be noted that the three parameters correspond to those of the LSTM, as the conditional quantum master equation is equivalent to the recurrent neural network in terms of the unfolding of the calculation view, i.e. FIGS. 4 and 5 (Detailed unfolding will be carried out in the following exemplary embodiments); meanwhile, as the LSTM is related to the quantum transport system, and the shot noise spectrum is used to describe the quantum transport system/process, the shot noise spectrum is used as the input parameter $x_t$ of the LSTM.

In other words, the parameter $x_t$ is the input parameter to the network and sequence data, and the shot noise spectrum is also sequence data. In actual operation, the shot noise spectrum is input into the network as $x_t$, that is, the first data of the shot noise spectrum is input in the first step, and the second data of the shot noise spectrum is input in the second step, and so on. The correspondence between $\phi$ and network parameters should be discussed from a macro perspective. The changes between the previous step and the current step of h are linked by $\phi$, and the previous step of the parameter h is linked with its current step by network parameters. Both network parameters and $\phi$ can link the previous step of one parameter with its current step, and h corresponds to $\rho$, so $\phi$ corresponds to network parameters.

In other specific exemplary embodiments, the trained recurrent neural network or LSTM can be used to guide the technical field of designing micro-nano quantum devices.

It is to be noted that in the training process, the input value $x_t$, i.e. the data of shot noise spectrum $S(\omega)$ generated in the quantum transport process, is a known parameter, and the parameter (W, b) is a parameter to be trained, and the output value $h_t$, i.e. a trace of the density matrix $\text{Tr}[\rho^{(n)}(t)]$ in the conditional quantum master equation, is unknown data. It is to be noted that the output value $h_t$ is unknown and is calculated through the LSTM. In the calculation process, only an initial value ho needs to be given, and the following time steps are calculated through the LSTM.

Figure 2:
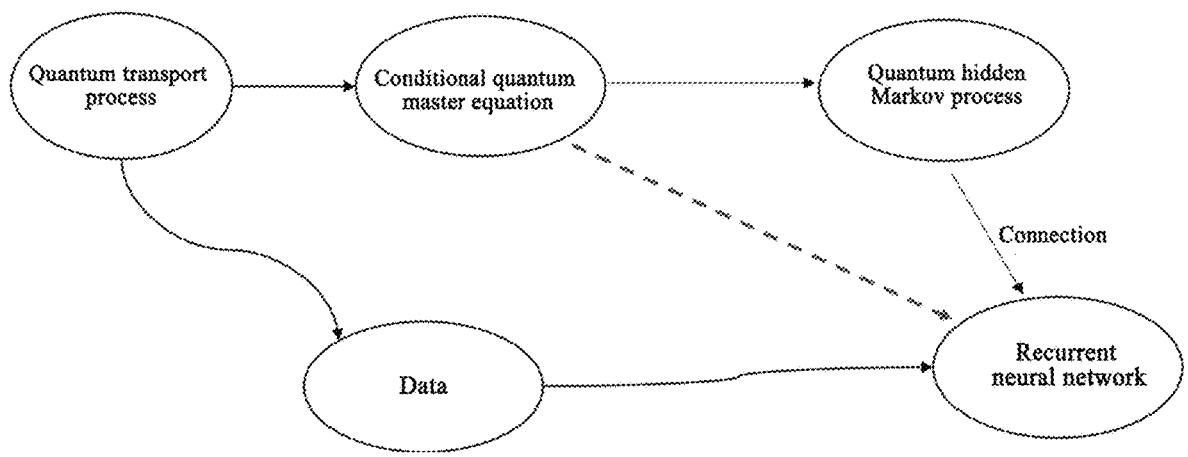
FIG. 2 is a technology implementation roadmap according to an exemplary embodiment of the disclosure.

Specifically, in the following exemplary embodiments, the conditional quantum master equation describing the quantum transport process is first derived, and the quantum hidden Markov process is found to have a certain connection with the quantum main equation. The connection between the quantum hidden Markov process and the recurrent neural network is found by unfolding the calculation view of the quantum hidden Markov process, as shown in FIG. 2.

Figure 3:
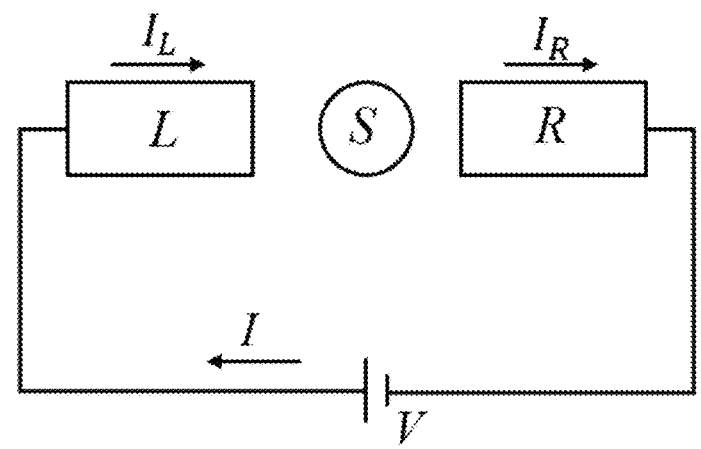
FIG. 3 is a structural schematic view of a two-level charge qubit transport system according to an exemplary embodiment of the disclosure.

Preferably, in an exemplary embodiment, the conditional quantum master equation is derived from a two-level charge qubit transport system; as shown in FIG. 3, the two-level charge qubit transport system comprises a quantum dot system S and a power supply V, wherein a left electrode L of the quantum dot system S is connected to a positive electrode of the power supply V, while a right electrode R of the quantum dot system S is connected to a negative electrode of the power supply V; electrons flow through quantum dots under the excitation of external voltage.

The total Hamiltonian of the two-level charge qubit transport system is as follows:

$$H = H_S(a_\mu^\dagger, a_\mu) + H_E + H' \quad (1)$$

where: $H_S$ represents the Hamiltonian of the quantum dot system S; $H_E$ represents the Hamiltonian of the left electrode L and the right electrode R; and H' represents the Hamiltonian arising from the interaction between the quantum dot system S and the electrodes.

Preferably, in another exemplary embodiment, the concrete forms of $H_s$, $H_E$ and H' are as follows:

$$H_s = \sum_{s=\uparrow,\downarrow}\sum_{j=1,2} U'_j a_{js}^\dagger a_{js} + \sum_{j=1,2} \omega \cdot n_{j\uparrow} n_{j\downarrow} + C_E\left(\sum_{s=\uparrow,\downarrow}\sum_{j=1,2} n_{js}\right)^2 \quad (2)$$

$$H_E = \sum_{\alpha=L,R}\sum_{s=\uparrow,\downarrow}\sum_k U'_{\alpha k s} c_{\alpha k s}^\dagger c_{\alpha k s}$$

$$H' = \sum_{\alpha=L,R}\sum_{s=\uparrow,\downarrow}\sum_{j=1,2}\sum_k \tau_{\alpha k j} c_{\alpha k s}^\dagger a_{js} + h.c.$$

where: s represents the spin of the electrons, and $\uparrow$, $\downarrow$ represents spinning up and spinning down respectively; j represents the energy level, and $\acute{U}_j$ represents the energy at the level j; $a_{js}^\dagger/a_{js}$ is represents creation/annihilation operators of electrons at the level j and with the spin s; $\omega$ represents Coulomb energy of two electrons at the same level but with different spins, and $n_{j\uparrow}$ $n_{j\downarrow}$ and $n_{js}$ represents number operators of electrons at the level j and with the spins $\uparrow,\downarrow$, s; $C_E$ represents charge energy related to electrons at all levels; a represents electrodes; k represents momentum of electrons; $\acute{U}_{\alpha k s}$ represents energy of electrons with the momentum k at the electrodes; and considering that the electrons on the electrodes are in thermal statistical equilibrium, the distribution function is as follows:

$$f(\acute{U}) = \frac{1}{\exp[(\acute{U}-\mu)/k_B T]+1} \quad (3)$$

$\mu$ represents Fermi energy which is equal to $\mu_L = eV/2$, $\mu_R = -eV/2$, considering that external voltages are applied to the system in pairs; T represents temperature, i.e. the temperature of quantum transport system, and kB represents Boltzmann constant;

$c_{\alpha ks}^{\dagger}$ represents the creation operator of electrons with the spin s and momentum k at the electrode α; $c_{\alpha ks}$ represents annihilation operator of electrons with the spin s and momentum k at the electrode α; $\tau_{\alpha kj}$ represents the strength of the interaction between the system and the environment, and h.c. represents Hermitian conjugate.

Preferably, in an exemplary embodiment, it is assumed that the quantum dot system S does not strongly interact with the environment and H' can be treated as a perturbation, the quantum master equation describing the quantum transport process is obtained according to the second-moment cumulant expansion and the Lindblad equation:

$$\dot{\rho}(t) = -iL\rho(t) - \int_0^t d\tau \langle L'(t)G(t,\tau)L'(\tau)G^{\ast}(t,\tau))\rangle g\rho(t) \quad (4)$$

where: Liouville superoperator is defined as $L(\ldots) \triangleq [H_S,(\ldots)]$, $L'(\ldots) \triangleq [H',(\ldots)]$. $G(t,\tau) \triangleq G(t,\tau) \times (\ldots) \times G^{\dagger}(t,\tau)$, $G(t,\tau)$ is the propagator (Green function) related to the Hamiltonian $H_S$ of the quantum dot system S; the reduced density matrix of the quantum dot system S is $\rho(t) = Tr_E[\rho_T(t)]$, $\langle (\ldots) \rangle = Tr_E[(\ldots)\rho_E]$, and $\rho_E$ represents a density matrix of electrodes; i represents an imaginary unit, and $\rho(t)$ represents a density matrix at t, and τ represents any moment less than t, and $\dot{\rho}(t)$ represents a derivative of $\rho(t)$ with respect to time;

If the Hilbert space where the electrodes are located is divided and $E^{(n)}$ is used to represent the space where the electrodes are located under the conditions that n electrons pass through the quantum dot system S within Dt, such space can be represented as $E = \oplus_n E^{(n)}$; it is important to note that when n=0, the Hilbert space without electrons passing through the quantum dot system comprises subspace of left and right electrodes, i.e. $E^{(0)} \triangleq \mathrm{span}\{|Y_L\rangle \otimes \langle Y_R|\}$.

The conditional quantum master equation can be obtained by substituting the assumption above into the quantum master equation (4):

$$\dot{\rho}^{(n)}(t) = -iL\rho^{(n)}(t) - \int_0^t d\tau Tr_{E^{(n)}}[L'(t)G(t,\tau)L'(\tau)G^{\ast}(t,\tau)\rho_T(t)] \quad (5)$$

where: $\rho^{(n)}(t) = Tr_{E^{(n)}}[\rho^T]$ represents the reduced density matrix of the quantum dot system S under the conditions that n electrons pass through the system within Dt; $\rho^{(n)}(t)$ represents the reduced density matrix of the quantum dot system S under the conditions that n electrons pass through the system within Dt; $\dot{\rho}^{(n)}(t)$ represents a derivative of $\rho^{(n)}(t)$ with respect to time.

Preferably, in an exemplary embodiment, it is assumed that $\rho_E^{(n)} = \rho_E^{(n\pm1)} = \rho_E^{(0)}$, the conditional quantum master equation can be rewritten under the Markov approximation:

$$\dot{\rho}^{(n)}(t) =$$
$$-iL\rho^{(n)}(t) - \frac{1}{2}\sum_{js}\left\{\begin{bmatrix} a_{js}^{\dagger}A_{js}^{(-)}\rho^{(n)} + \rho^{(n)}A_{js}^{(+)}a_{js}^{\dagger} - A_{Ljs}^{(-)}\rho^{(n)}a_{js}^{\dagger} - \\ a_{js}^{\dagger}\rho^{(n)}A_{Ljs}^{(+)} - A_{Ljs}^{(-)}\rho^{(n-1)}a_{js}^{\dagger} - a_{js}^{\dagger}\rho^{(n+1)}A_{Rjs}^{(+)} \end{bmatrix} + h.c\right\} \quad (6)$$

where: $A_{js}^{(\pm)} = \sum_{\alpha=L,R} A_{60\,js}^{(\pm)}$, $A_{\alpha js}^{(\pm)} C_{\alpha js}^{(\pm)}(\gamma)\alpha_{js}$, $C_{\alpha js}^{(\pm)}$ is the spectral function of electrons in the electrode; $\rho^{(n)}$ is $\rho^{(n)}(t)$, and $a_{js}^{+}$ represents the creation operator of electrons at the level of j and with the spin s; $a_{js}^{+}$ represents the annihilation operator of electrons at the level j and with the spin s; and γ represents an independent variable in the spectral function $C_{\alpha js}^{(\pm)}$; Equation (6) is referred to as the rewritten equation of the conditional quantum master equation in the following contents.

The current flowing through the quantum dot system S is expressed as:

$$I(t) = e\frac{d[\sum_n nP(n,t)]}{dt} = e\sum_n nTr[\dot{\rho}^{(n)}(t)] \quad (7)$$

where: P(n,t) represents a probability of passing through the quantum dot system S by n electrons within Dt, and e represents the unit charge, and n represents the number of electrons passing through the quantum dot system S per unit time;

According to the MacDonald formula, the shot noise spectrum of current is expressed as:

$$S(\omega) = 2\omega \int_0^{\infty} dt \sin(\omega t)\frac{d}{dt}[\langle n^2(t)\rangle - \langle \overline{I}t\rangle^2] \quad (8)$$

where: ω represents an independent variable in the function of shot noise S(ω), similar to the frequency in the Fourier transform.

In the exemplary embodiment above, the conditional quantum master equation describing the quantum transport process is derived, and the quantum hidden Markov process is found in the following contents to have a certain connection with the quantum main equation. The connection between the quantum hidden Markov process and the recurrent neural network is found by unfolding the calculation view of the quantum hidden Markov process. Specifically:

Preferably, in an exemplary embodiment, the connection between the density matrices of the two-level charge qubit transport system at different moments is expressed by the Kraus operator, i.e. the quantum hidden Markov: i.e. $\rho(t+Dt) = \sum_m K_m \rho(t) K_m^{\dagger}$, where: m denotes different K values, and Km is the $m^{th}$ Kraus operator; the formula is equivalent to the quantum master equation, Formula (4);

Based on the conditional quantum master equation, $\sum_n \rho^{(n)}(t+\Delta t) = \sum_m K_m \sum_n \rho^{(n)}(t) K_m^{\dagger}$ can be obtained by substituting $\rho(t) = \sum_n \rho^{(n)}(t)$ into the formula above;

According to the rewritten equation of the conditional quantum master equation, i.e. Formula (6), $\rho^{(n)}(t+Dt)$ is related to $\rho^{(n)}(t), \rho^{(n-1)}(t), \rho^{(n+1)}(t)$, so it can be derived from the above formula: $\rho^{(n)}(t+Dt) = \phi(\sum_m K_m(\rho^{(n)}(t) + \rho^{(n-1)}(t) + \rho^{(n+1)}(t))K_m^{\dagger})$; that is, the formula is related to the rewritten equation of the conditional quantum master equation, with an aim at constructing the time-free mapping $\phi(\sum_m K_m(\ldots)K_m^{\dagger})$.

Figure 4:
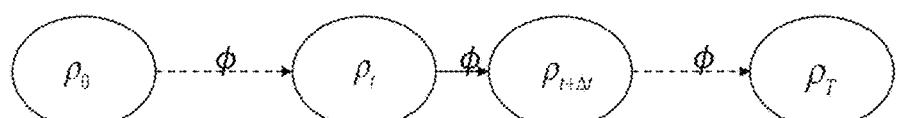
FIG. 4 is a calculation chart of quantum hidden Markov according to an exemplary embodiment of the disclosure.
Figure 5:
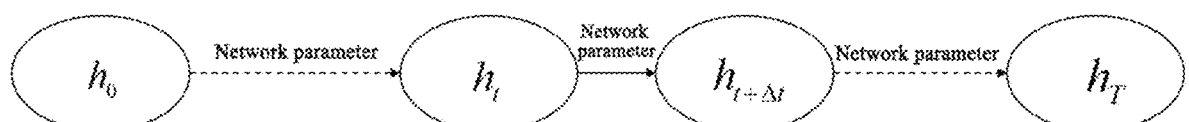
FIG. 5 is a calculation chart of LSTM according to an exemplary embodiment of the disclosure.

The calculation views of the quantum hidden Markov and recurrent neural network are compared in the following contents, and it is found that they are very similar. Specifically:

FIG. 4 is the calculation view of quantum hidden Markov. For the quantum hidden Markov, the evolution of density matrices is actually a cyclic process of calculating parameters that do not change with time, that is, the parameter φ is used for every change. FIG. 5 is the calculation view of LSTM. After the LSTM training, the calculated parameter (W, b) keeps unchanged. Therefore, the connection between the quantum hidden Markov process and the recurrent neural network (calculation view of LSTM) is found by unfolding the calculation view of the quantum hidden Markov process.

Figure 6:
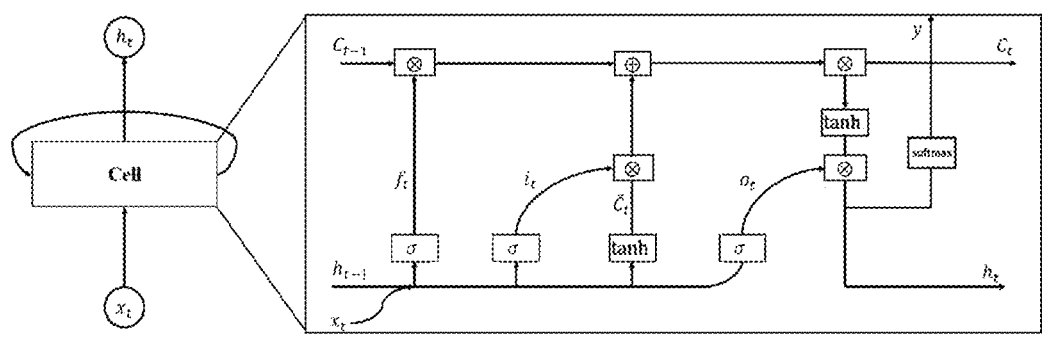
FIG. 6 is a structural schematic view of LSTM cells of the LSTM according to an exemplary embodiment of the disclosure.

Specifically, the LSTM is a subclass of the recurrent neural network, which has great advantages in processing time series data. FIG. 6 shows the specific structure of LSTM cells of the LSTM.

Preferably, in an exemplary embodiment, the connection between the input value $x_t$ and the output value $h_t$ of the LSTM cell is expressed through the following equation:

$$f_t = \sigma(W_f \cdot [h_{t-1}, x_t] + b_f) \quad (9)$$
$$i_t = \sigma(W_i \cdot [h_{t-1}, x_t] + b_i)$$
$$\tilde{C}_t = \tanh(W_c \cdot [h_{t-1}, x_t] + b_c)$$
$$O_t = \sigma(W_O \cdot [h_{t-1}, x_t] + b_O)$$
$$h_t = O_t \times \tanh(C_t)$$

where: $(W_f, W_i, W_c, W_O, b_f, b_i, b_c, b_O)$ is the parameter (W, b); $f_t$ is an output of a forget gate layer, and $i_t$ and $\tilde{c}_t$ are outputs of an input gate layer, and $O_t$ and $h_t$ are outputs of an output gate layer. The content of this part belongs to the specific content of the prior art and is repeated here.

$x_t$ is the current input value, and $h_t$ can be output and transferred into the LSTM cell at the next moment as the current output value.

Preferably, in an exemplary embodiment, as only information of the traces of density matrices $\text{Tr}[\dot{\rho}^{(n)}(t)]$ is used for calculating the shot noise spectrum of the current (Formula (8)), only the data of the shot noise spectrum can be used to construct the connection between the traces of density matrices at t-1 and t, namely $\text{Tr}[\sigma \Sigma_m K_m( \ldots )K_m^\dagger]$ (the constructed connection excludes time);

The trace of the density matrix is 1 in the whole evolution process. Therefore, according to $\rho(t) = \Sigma_n \rho^{(n)}(t)$, only the trace of the density matrix $\text{Tr}[\rho(t)] = \text{Tr}[\Sigma_n \rho^{(n)}(t)] = \Sigma_n \text{Tr}[\rho^{(n)}(t)] = 1$ can be kept unchanged in the conditional quantum master equation (Formula (5)), and it is impossible to guarantee that $\text{Tr}[\rho^{(n)}(t)]$ keeps unchanged; as the formula $(\text{Tr}[\rho^{(n)}(t)])$ is not identically equal to 1, simulation is necessary;

The evolution of density matrices is actually a cyclic process of calculating parameters that do not change with time, which is consistent with the calculation idea of the recurrent neural network, that is, after the recurrent neural network training, the parameter (W, b) remains unchanged;

$\text{Tr}[\rho^{(n)}(t)]$ corresponds to the parameter k in the LSTM. The reason is that the parameter k can get the result of $\text{Tr}[h_t] = \text{Tr}[\Sigma_n h_t^{(n)}] = \Sigma_n \text{Tr}[h_n^{(n)}] = 1$ through the SoftMax function, which is the same as $\text{Tr}[\rho^{(n)}(t)]$ (i.e. the overall sum is 1, but the individual value changes);

The parameter (W,b) can act as $\text{Tr}[\sigma \Sigma_m K_m( \ldots )K_m^\dagger]$ to link the previous step and the next step.

Our goal is to construct such a connection with the data of the noise spectrum generated by the two-level quantum system.

However, here's a problem. The value of particle quantity n in Equation (6) can be arbitrarily taken, but an effective range of n should be determined in numerical experiments.

Figure 7:
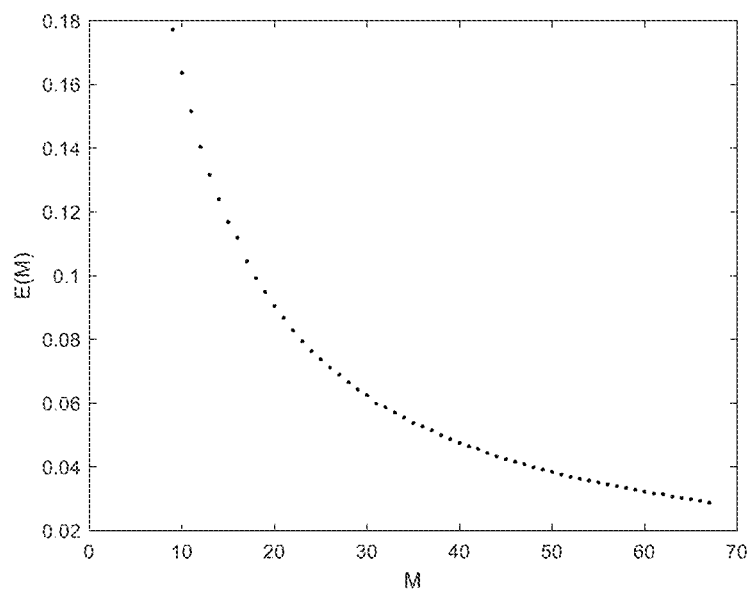
FIG. 7 is an image that E(M) changes with M in the range judgment according to an exemplary embodiment of the disclosure.

Preferably, in an exemplary embodiment, said method comprises the following steps:

The effective range of n is determined through the contribution of $\text{Tr}[\rho^{(n)}(t)]$ to the total current, and n represents the number of particles in the rewritten equation of the conditional quantum master equation; the evaluation function is defined:

$$E(M) = \frac{MP_M}{\sum_{n=0}^{M-1} nPn}$$

where: M is the maximum value of particle quantity that can be taken in numerical experiments, and $P_M$ is the probability value of M electrons flowing through the quantum dot system;

The image that E(M) changes with M is drawn by continuously adjusting the values of M, as shown in FIG. 7. The value of M can be determined according to FIG. 7. In one of the exemplary embodiments, if M=50, the contribution of $\text{Tr}[\rho^{(50)}(t)]$ to the total current only accounts for 0.4%.

Preferably, the data of the shot noise spectrum generated in the quantum transport process comprises training data and test data;

The recurrent neural network is trained by the training data to obtain a first connection between the error of the training data and the number of iterations and tested by the test data to obtain a second connection between the error of the test data and the number of iterations;

The first connection and the second connection are used to determine the effect of simulating the conditional quantum master equation by the LSTM.

Figure 8:
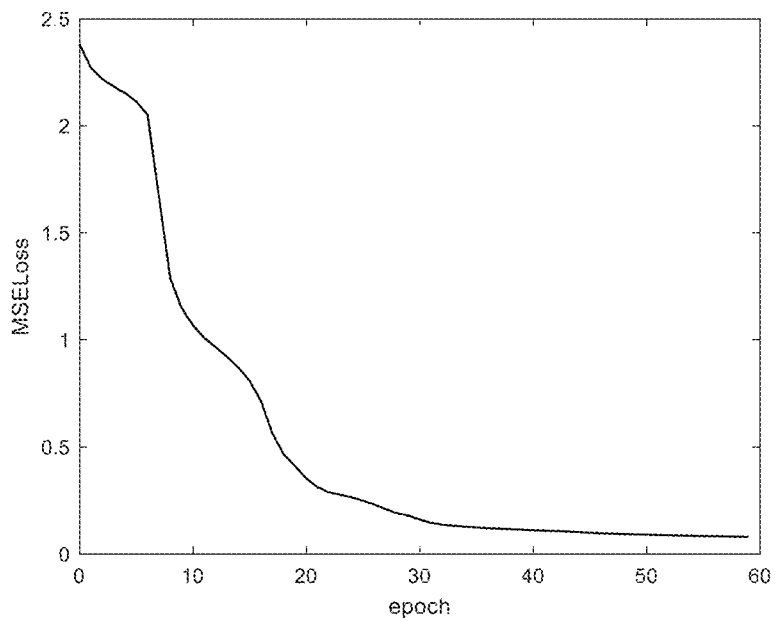
FIG. 8 is a connection view of the error of training data and the number of iterations according to an exemplary embodiment of the disclosure.
Figure 9:
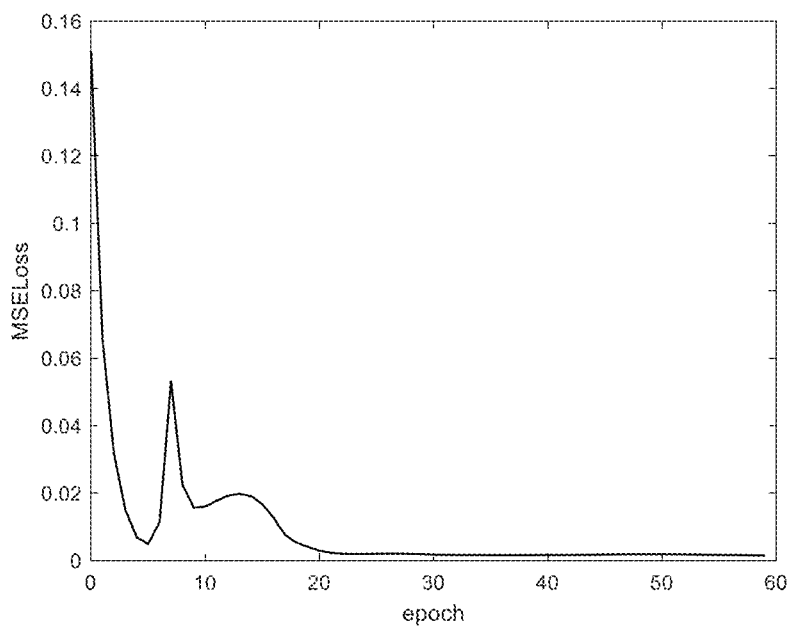
FIG. 9 is a connection view of the error of test data and the number of iterations according to an exemplary embodiment of the disclosure.

Specifically, FIG. 8 shows the connection between the error of training data and the number of iterations, and FIG. 9 shows the connection between the error of test data and the number of iterations. It can be seen from the figure that the error gradually decreases with the number of iterations until it converges, which shows that we have constructed $\text{Tr}[\sigma \Sigma_m K_m( \ldots )K_m^\dagger]$ through the LSTM. That is, we have simulated the conditional quantum master equation with the LSTM.

Obviously, the embodiments above are only examples for clear descriptions, not the restrictions to mode of embodiments. Persons of ordinary skill in the art can also make other changes in different forms on the basis of the descriptions above. It is not necessary neither possible to exhaustively list each embodiment. The obvious change arising from the embodiments above is still in the range of protection by the disclosure.

The invention claimed is:

1. A method of stimulating a conditional quantum master equation in a quantum transport process by a recurrent neural network, comprising the following steps of:
   establishing a recurrent neural network which is a long short term memory network (LSTM), wherein the LSTM comprises I LSTM cells arranged in chronological order, and each LSTM cell has an input value $x_t$ and an output value $h_t$, and the output value $h_t$ will be transferred into the LSTM cell at the next moment, in which there is a parameter (W, b);
   replacing the input value $x_t$ with a shot noise spectrum of the current obtained according to the conditional quantum master equation; replacing the output value $h_t$ with a trace of density matrices in the conditional quantum master equation; replacing the parameter (W, b) with a connection between traces of density matrices in the conditional quantum master equation at t−1 and t; and training the recurrent neural network by using data of the shot noise spectrum generated in the quantum transport process to achieve the purpose of simulating the conditional quantum master equation, wherein the quantum transport process corresponds to a physically realizable system.

2. The method of stimulating the conditional quantum master equation in the quantum transport process by the recurrent neural network according to claim 1, wherein the conditional quantum master equation is derived from a two-level charge qubit transport system comprising a quantum dot system S and a power supply V, and a left electrode L of the quantum dot system S is connected to a positive electrode of the power supply V, while a right electrode R of the quantum dot system S is connected to a negative electrode of the power supply V; and the total Hamiltonian of the two-level charge qubit transport system is as follows:

$$H = H_S(a_\mu^\dagger, a_\mu) + H_E + H'$$

where: $H_S$ represents the Hamiltonian of the quantum dot system S; $H_E$ represents the Hamiltonian of the left electrode L and the right electrode R; and H' represents the Hamiltonian arising from the interaction between the quantum dot system S and the electrodes.

3. The method of stimulating the conditional quantum master equation in the quantum transport process by the recurrent neural network according to claim 2, wherein it is assumed that the quantum dot system S does not strongly interact with the environment and H' is treated as a perturbation, the quantum master equation describing the quantum transport process is obtained according to the second-moment cumulant expansion and the Lindblad equation:

$$\dot{\rho}(t) = -i\mathcal{L}\rho(t) - \int_0^t d\tau \langle \mathcal{L}'(t)\mathcal{G}(t,\tau)\mathcal{L}'(\tau)\mathcal{G}^*(t,\tau)\rangle \rho(t)$$

where: Liouville superoperator is defined as L( ... ) ▫ [$H_S$,( ... )], L'( ... ) ▫ [H',( ... )], G(t,τ) ▫ G(t,τ)×( ... )×G†(t,τ), G(t,τ) is a propagator related to the Hamiltonian H, of the quantum dot system S; a reduced density matrix of the quantum dot system S is $\rho(t) = \text{Tr}_E[\rho_T(t)]$, $\langle ( \ldots ) \rangle = \text{Tr}_E[( \ldots )\rho_E]$, and $\rho_E$ represents a density matrix of electrodes; i represents an imaginary unit, and ρ(t) represents a density matrix at t, and τ represents any moment less than t, and $\dot{\rho}(t)$ represents a derivative of ρ(t) with respect to time; and the Hilbert space where the electrodes are located is divided, using $E^{(n)}$ to represent the space where the electrodes are located under the conditions that n electrons pass through the quantum dot system S within Dt, and such space can be represented as $E = \oplus_n E^{(n)}$; the conditional quantum master equation can be obtained by substituting the assumption above into the quantum master equation:

$$\dot{\rho}^{(n)}(t) = -i\mathcal{L}\rho^{(n)}(t) - \int_0^t d\tau \text{Tr}_{E^{(n)}}[\mathcal{L}'(t)\mathcal{G}(t,\tau)\mathcal{L}'(\tau)\mathcal{G}^*(t,\tau)\rho_T(t)]$$

where: $\rho^{(n)}(t) = \text{Tr}_{E^{(n)}}[\rho_T(t)]$ represents the reduced density matrix of the quantum dot system S under the conditions that n electrons pass through the system within Dt; $\rho^{(n)}(t)$ represents the reduced density matrix of the quantum dot system S under the conditions that n electrons pass through the system within Dt; $\dot{\rho}^{(n)}(t)$ represents a derivative of $\rho^{(n)}(t)$ respect to time.

4. The method of stimulating the conditional quantum master equation in the quantum transport process by the recurrent neural network according to claim 3, wherein the concrete forms of $H_S$, $H_E$ and H' are as follows:

$$H_S = \sum_{s=\uparrow,\downarrow}\sum_{j=1,2}' U_j a_{js}^\dagger a_{js} + \sum_{j=1,2} \omega \cdot n_{j\uparrow} n_{j\downarrow} + C_E\left(\sum_{s=\uparrow,\downarrow}\sum_{j=1,2} n_{js}\right)^2$$

$$H_E = \sum_{\alpha=L,R}\sum_{s=\uparrow,\downarrow}\sum_k' U_{\alpha ks} c_{\alpha ks}^\dagger c_{\alpha ks}$$

$$H' = \sum_{\alpha=L,R}\sum_{s=\uparrow,\downarrow}\sum_{j=1,2}\sum_k \tau_{\alpha kj} c_{\alpha ks}^\dagger a_{js} + h.c.$$

where: s represents the spin of the electrons, and ↑,↓ represents spinning up and spinning down respectively; j represents the energy level, and ó$_j$ represents the energy at the level j; $a_{js}^\dagger/a_{js}$ is represents creation/annihilation operators of electrons at the level j and with the spin s; ω represents Coulomb energy of two electrons at the same level but with different spins, and $n_{j\uparrow}$, $n_{j\downarrow}$ and $n_{js}$ represents number operators of electrons at the level j and with the spins ↑,↓, s; $C_E$ represents charge energy related to electrons at all levels; α represents electrodes; k represents momentum of electrons; ó$_{\alpha ks}$ represents energy of electrons with a momentum of k at the electrodes; and considering that the electrons on the electrodes are in thermal statistical equilibrium, a distribution function is as follows:

$$f(U') = \frac{1}{\exp[(U'-\mu)/k_B T] + 1}$$

μ represents Fermi energy which is equal to $\mu_L = eV/2$, $\mu_R = -eV/2$, considering that external voltages are applied to the system in pairs; T represents temperature, i.e. the temperature of quantum transport system, and $k_B$ represents Boltzmann constant; $c_{\alpha ks}^\dagger$ represents the creation operator of electrons with the spin s and the momentum k at the electrode α; $c_{\alpha ks}$ represents annihilation operator of electrons with the spin s and momentum k at the electrode α; $\tau_{\alpha kj}$ represents the strength of the interaction between the system and the environment, and h.c. represents Hermitian conjugate.

5. The method of stimulating the conditional quantum master equation in the quantum transport process by the recurrent neural network according to claim 4, wherein it is assumed that $\rho_E^{(n)} = \rho_E^{(n\pm1)} = \rho_E^{(0)}$, the conditional quantum master equation can be rewritten under the Markov approximation:

$$\dot{\rho}^{(n)}(t) =$$

$$-i\mathcal{L}\rho^{(n)}(t) - \frac{1}{2}\sum_{js}\left\{\begin{bmatrix}a_{js}^\dagger A_{js}^{(-)}\rho^{(n)} + \rho^{(n)}A_{js}^{(+)}a_{js}^\dagger - A_{Ljs}^{(-)}\rho^{(n)}a_{js}^\dagger - \\ a_{js}^\dagger \rho^{(n)} A_{Ljs}^{(+)} - A_{Ljs}^{(-)}\rho^{(n-1)}a_{js}^\dagger - a_{js}^\dagger \rho^{(n+1)}A_{Rjs}^{(+)}\end{bmatrix} + h.c.\right\};$$

where:

$$A_{js}^{(\pm)} = \sum_{\alpha=L,R} A_{\alpha js}^{(\pm)}, A_{\alpha js}^{(\pm)} = C_{\alpha js}^{(\pm)}(\gamma)\alpha_{js}, C_{\alpha js}^{(\pm)}$$

is the spectral function of electrons in the electrode; is $\rho^{(n)}$ is $\rho^{(n)}(t)$, and $a_{jz}^+$ represents a creation operator of electrons at a level of j and with a spin s; $a_{jz}^+$ represents an annihilation operator of electrons at the level of j and with the spin s; and $\gamma$ represents an independent variable in a spectral function $C_{\alpha js}^{(\pm)}$; and the current flowing through the quantum dot system S is expressed as:

$$I(t) = e\frac{d\left[\sum_n nP(n,t)\right]}{dt} = e\sum_n nTr[\dot{\rho}^{(n)}(t)];$$

where: P(n,t) represents a probability of passing through the quantum dot system S by n electrons within Dt, and e represents the unit charge, and n represents the number of electrons passing through the quantum dot system S per unit time; and according to the MacDonald formula, the shot noise spectrum of current is expressed as;

$$S(\omega) = 2\omega \int_0^\infty dt \sin(\omega t)\frac{d}{dt}\left[\langle n^2(t)\rangle - \langle \overline{I}t\rangle^2\right]$$

where: $\omega$ represents an independent variable in the function of the shot noise $S(\omega)$.

6. The method of stimulating the conditional quantum master equation in the quantum transport process by the recurrent neural network according to claim 5, wherein a connection between the density matrices of the two-level charge qubit transport system at different moments is expressed by the Kraus operator, i.e. the quantum hidden Markov: i.e. $\rho(t+Dt)=\Sigma_m K_m \rho(t) K_m^\dagger$, where: m denotes different K values, and Km is the $m^{th}$ Kraus operator; the Kraus operator formula is equivalent to the quantum master equation;

based on the conditional quantum master equation, $$\sum_n \rho^{(n)}(t+\Delta t) = \sum_m K_m \sum_n \rho^{(n)}(t) K_m^\dagger$$

can be obtained by rewriting $\rho(t)=\Sigma_n\rho^{(n)}(t)$ into the Kraus operator formula; and according to the rewritten equation of the conditional quantum master equation, $\rho^{(n)}(t+Dt)$ is related to $\rho^{(n)}(t),\rho^{(n-1)}(t),\rho^{(n+1)}(t)$, so it can be derived from the $$\sum_n \rho^{(n)}(t+\Delta t) = \sum_m K_m \sum_n \rho^{(n)}(t) K_m^\dagger \text{ formula:}$$

$$\rho^{(n)}(t+D') = \phi\left(\sum_m K_m \left(\rho^{(n)}(t) + \rho^{(n-1)}(t) + \rho^{(n+1)}(t)\right) K_m^\dagger\right); \text{ that is, the } \rho^{(n)}(t+D')$$

$$= \phi\left(\sum_m K_m \left(\rho^{(n)}(t) + \rho^{(n-1)}(t) + \rho^{(n+1)}(t)\right) K_m^\dagger\right)$$

formula is related to the rewritten equation of the conditional quantum master equation, with an aim at constructing the time-free mapping $\phi(\Sigma_m K_m (\ldots) K_m^\dagger)$.

7. The method of stimulating the conditional quantum master equation in the quantum transport process by the recurrent neural network according to claim 6, wherein a connection between the input value $x_t$ and the output value $h_t$ of the LSTM cell is expressed through the following equation:

$$f_t = \sigma(W_f \cdot [h_{t-1}, x_t] + b_f)$$
$$i_t = \sigma(W_i \cdot [h_{t-1}, x_t] + b_i)$$
$$\tilde{C}_t = \tanh(W_c \cdot [h_{t-1}, x_t] + b_c)$$
$$O_t = \sigma(W_O \cdot [h_{t-1}, x_t] + b_O)$$
$$h_t = O_t \times \tanh(C_t)$$

where: $(W_f, W_i, W_c, W_o, b_f, b_i, b_c, b_o)$ is the parameter (W,b); $f_t$ is an output of a forget gate layer, and $i_t$ and $\tilde{C}_t$, are outputs of an input gate layer, and $O_t$ and $h_t$ are outputs of an output gate layer.

8. The method of stimulating the conditional quantum master equation in the quantum transport process by the recurrent neural network according to claim 7, wherein a connection between the traces of density matrices at t−1 and t is constructed by using the data of the shot noise spectrum, namely $Tr[\phi(\Sigma_m K_m(\ldots)K_m^\dagger)]$;

$Tr[\rho^{(n)}(t)]$ corresponds to the parameter $h_t$ in the LSTM; and the parameter (W,b) in the LSTM can be used as $Tr[\phi(\Sigma_m K_m(\ldots)K_m^\dagger)]$.

9. The method of stimulating the conditional quantum master equation in the quantum transport process by the recurrent neural network according to claim 5, comprising the following steps of:

determining an effective range of n through the contribution of $Tr[\rho^{(n)}(t)]$ to a total current, wherein n represents a number of particles in the rewritten equation of the conditional quantum master equation; an evaluation function is defined:

$$E(M) = \frac{MP_M}{\sum_{n=0}^{M-1} nPn}$$

where: M is a maximum value of particle quantity that can be taken in numerical experiments, and $P_M$ is a probability value of M electrons flowing through the quantum dot system; and drawing an image that E(M) changes with M by continuously adjusting the values of M, wherein a change image can be used to determine the value of M.

10. The method of stimulating the conditional quantum master equation in the quantum transport process by the recurrent neural network according to claim 1, wherein the data of the shot noise spectrum generated in the quantum transport process comprises training data and test data;

the recurrent neural network is trained by the training data to obtain a first connection between an error of the training data and a number of iterations and tested by the test data to obtain a second connection between an error of the test data and a number of iterations; and the first connection and the second connection are used to determine an effect of simulating the conditional quantum master equation by the LSTM.

* * * * *